United States Patent
Gupta (10) Patent No.: US 11,321,703 B2
(45) Date of Patent: May 3, 2022

(54) SMART CARD WITH BUILT-IN SUPPORT PROVISIONING MECHANISM

(71) Applicant: Bank of America Corporation, Charlotte, NC (US)

(72) Inventor: Saurabh Gupta, New Delhi (IN)

(73) Assignee: Bank of America Corporation, Charlotte, NC (US)

( * ) Notice: Subject to any disclaimer, the term of this patent is extended or adjusted under 35 U.S.C. 154(b) by 102 days.

(21) Appl. No.: 16/896,488

(22) Filed: Jun. 9, 2020

(65) Prior Publication Data

US 2021/0383357 A1  Dec. 9, 2021

(51) Int. Cl.

| | |
|---|---|
| *G06Q 20/34* | (2012.01) |
| *G06Q 30/02* | (2012.01) |
| *G06K 19/07* | (2006.01) |
| *G06K 19/077* | (2006.01) |
| *H04N 7/14* | (2006.01) |

(52) U.S. Cl.
CPC ....... *G06Q 20/341* (2013.01); *G06K 19/0702* (2013.01); *G06K 19/07701* (2013.01); *G06Q 20/357* (2013.01); *G06Q 30/0281* (2013.01); *H04N 7/141* (2013.01)

(58) Field of Classification Search
CPC combination set(s) only.
See application file for complete search history.

(56) References Cited

U.S. PATENT DOCUMENTS

| | | | |
|---|---|---|---|
| 5,359,183 A | 10/1994 | Skodlar | |
| 5,734,154 A | 3/1998 | Jachimowicz et al. | |
| 6,019,284 A | 2/2000 | Freeman et al. | |
| 6,068,183 A | 5/2000 | Freeman et al. | |
| 7,599,847 B2 * | 10/2009 | Block | G06Q 20/206 235/375 |
| 9,665,818 B1 * | 5/2017 | Cardinal | G06K 19/0704 |
| 2015/0302416 A1 * | 10/2015 | DeCelles | G06Q 30/016 705/304 |
| 2017/0061411 A1 * | 3/2017 | Sherman | H04N 7/15 |
| 2019/0244213 A1 * | 8/2019 | Iacono | G06Q 30/016 |
| 2019/0286805 A1 | 9/2019 | Law et al. | |

\* cited by examiner

*Primary Examiner* — Christle I Marshall
(74) *Attorney, Agent, or Firm* — Weiss & Arons LLP (57) ABSTRACT

Systems and methods for augmenting a dedicated payment instrument to leverage built-in access to real-time support from a central system are provided. Methods may be executed via computer-executable instructions that are stored in a non-transitory memory of the instrument and run on a microprocessor embedded in the instrument. Methods may include receiving a request from a user of the instrument, via one or more sensors, to initiate a support session. The sensors may include a camera, a microphone, and/or a tactile sensor. Methods may include transmitting the request to the central system via a wireless communication element, and receiving, from the central system, support session data. Methods may also include displaying, on a display screen, information based on the support session data.

16 Claims, 5 Drawing Sheets

SMART CARD WITH BUILT-IN SUPPORT PROVISIONING MECHANISM

FIELD OF TECHNOLOGY

Aspects of the disclosure relate to computer systems. Specifically, aspects of the disclosure relate to systems and methods for providing specialized smart payment instruments.

BACKGROUND OF THE DISCLOSURE

Payment instruments, such as credit and debit cards, are utilized by millions of users every day across the globe. Maximizing the utility of such instruments often relies on a robust support system. Support may include a session with a support associate. Support may include execution of a request, such as a balance transfer associated with the instrument. Support may also include resolution of an inquiry, such as an account balance inquiry associated with the instrument, a transaction information inquiry associated with the instrument, or an offer inquiry associated with the instrument.

Typically, receiving the requisite support involves activity external to the instrument. The user must generally visit a physical branch of a financial institution, or conduct a telephone call or other form of communication via a separate device, to receive the support. Necessitating external activity is inconvenient and inefficient. Involving separate devices may also present security risks.

It would be desirable, therefore, to provide systems and methods for smart payment instruments with built-in support provisioning mechanisms, thereby increasing the efficiency and security of the payment instruments.

SUMMARY OF THE DISCLOSURE

Aspects of the disclosure relate to a smart payment instrument. The smart payment instrument may be a dedicated smart payment instrument with built-in support provisioning mechanisms. The instrument may include a microprocessor, a display screen, and one or more sensors. The sensors may include a camera, a microphone, and/or a tactile sensor.

The instrument may also include a power source for the microprocessor, the display screen, and the sensors. The instrument may also include a wireless communication element configured to provide wireless communication between the instrument and a central system. The instrument may also include a non-transitory memory storing computer-executable instructions, that, when run on the microprocessor, are configured to provide some or all of the instrument functionality.

The instrument may be configured to receive a request from a user of the instrument, via the sensors, to initiate a support session. The instrument may transmit the request to the central system via the wireless communication element. The instrument may receive, from the central system, support session data. The instrument may display, on the display screen, information based on the support session data.

BRIEF DESCRIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION OF THE DISCLOSURE

A smart payment instrument with built-in support provisioning mechanisms is provided. The instrument may provide increased efficiency and security. For example, efficiency may be increased by eliminating the need to use a device external to the instrument for receiving support. Security may be increased by providing a system with dedicated transactional hardware, software, and/or communication channels. Such a system may be associated with a decreased risk of infection with malware, spyware, or other security risk factors.

The instrument may include a microprocessor, a display screen, and one or more sensors. The sensors may include a camera, a microphone, and/or a tactile sensor.

The instrument may also include a power source for the microprocessor, the display screen, and the sensors. The instrument may also include a wireless communication element configured to provide wireless communication between the instrument and a central system. The instrument may also include a non-transitory memory storing computer-executable instructions. The instructions, when run on the microprocessor, may be configured to perform some or all of the disclosed features of the system.

The instrument may be configured to receive a request from a user of the instrument, via the sensors, to initiate a support session. The instrument may transmit the request to the central system via the wireless communication element. The instrument may receive, from the central system, support session data. The instrument may display information on the display screen. The information may be based on the support session data.

The instrument may, in certain preferred embodiments, be a card. The card may include metal and/or plastic. The card may at least partially resemble a typical debit or credit card. The card may have dimensions that conform to the ISO/IEC 7810 ID-1 standard. The dimensions may, in some embodiments, be no greater than 86 millimeters×54 millimeters×0.8 millimeters.

In certain embodiments of the instrument, the wireless communication element may include a nano wireless network interface card ("NIC"). The wireless communication element may include any suitable component capable of facilitating wireless communication.

In some embodiments, the power source may be rechargeable. The power source may recharge via solar energy. The power source may recharge via inductive charging, e.g., with a wireless recharging mechanism. The power source may recharge via a charging port. A charging port may include mini or micro Universal Serial Bus (USB) connectors, or any other suitable connector. The power source may recharge via any other suitable charging mechanism.

In some embodiments, the microprocessor, the power source, the wireless communication element, and/or the memory may be embedded in the card. The display screen may be affixed to the card and may be viewable on a surface of the card.

In certain embodiments, the request may be an audible request. The instrument may receive the request via the microphone. The instrument may process the request via voice recognition software.

In some embodiments, the request may be received via a tactile sensor. The tactile sensor may include a keypad that is separate from the display screen. In other embodiments, the tactile sensor may be a part of the display screen, and the display screen may be augmented to be a touchscreen.

The support session may, in certain embodiments, include a live video support session with a support associate. In response to a request for a live support session, the instrument may transmit the request to the central system. The central system may generate a scheduled time for the support session. The instrument may receive the scheduled time from the central system, and may further display the scheduled time via the display screen. At the scheduled time, the instrument may host the live video support session.

In some embodiments, to host the live video support session, the instrument may be configured to, in real time: receive video and/or audio of the support associate from the central system, and display the video of the support associate via the display screen and/or play the audio of the support associate via a speaker component of the instrument. The instrument may also be configured to receive audio of the user via the microphone and/or to receive video of the user via the camera, and transmit the audio of the user and/or the video of the user to the central system.

In some embodiments, the support session may include: a balance transfer associated with the instrument; an account balance inquiry associated with the instrument; a transaction information inquiry associated with the instrument; or an offer inquiry associated with the instrument. A support session may include execution of a transaction. In certain embodiments, the instrument may be configured to support all of the exemplary support sessions enumerated herein, in addition to any other suitable support session that may be useful in association with a payment instrument. The instrument may enable a user to select from a list and/or request a particular support session from the multiple supported types of support sessions.

A method for augmenting a dedicated payment instrument to leverage built-in access to real-time support from a central system is provided. The method may be executed via computer-executable instructions that are stored in a non-transitory memory of the instrument and run on a microprocessor embedded in the instrument.

The method may include receiving a request from a user of the instrument, via one or more sensors, to initiate a support session. The sensors may include a camera, a microphone, and/or a tactile sensor.

The method may include transmitting the request to the central system via a wireless communication element, and receiving, from the central system, support session data. The method may also include displaying, on a display screen, information based on the support session data.

In certain embodiments, the request may be an audible request. The method may further include receiving the request via the microphone, and processing the request via voice recognition software.

In some embodiments, the request may be received via the tactile sensor, and the tactile sensor may include a keypad that is separate from the display screen. In other embodiments, the tactile sensor may be a part of the display screen, and the display screen may be configured to be a touchscreen.

The support session may, in certain embodiments, include a live video support session with a support associate. In response to a request for a live video support session, the method may include: the central system generating a scheduled time for the support session; the instrument receiving the scheduled time from the central system; the instrument displaying the scheduled time via the display screen; and, at the scheduled time, the instrument hosting the live video support session.

In certain embodiments, to host the live video support session, the method may include receiving video and audio of the support associate from the central system, and displaying the video of the support associate via the display screen and playing the audio of the support associate via a speaker component of the instrument. The method may also include receiving audio of the user via the microphone and receiving video of the user via the camera, and transmitting the audio of the user and the video of the user to the central system.

In some embodiments of the method, the support session may include: a balance transfer associated with the instrument; an account balance inquiry associated with the instrument; a transaction information inquiry associated with the instrument; or an offer inquiry associated with the instrument.

Apparatus and methods described herein are illustrative. Apparatus and methods in accordance with this disclosure will now be described in connection with the figures, which form a part hereof. The figures show illustrative features of apparatus and method steps in accordance with the principles of this disclosure. It is understood that other embodiments may be utilized, and that structural, functional, and procedural modifications may be made without departing from the scope and spirit of the present disclosure.

Figure 1:
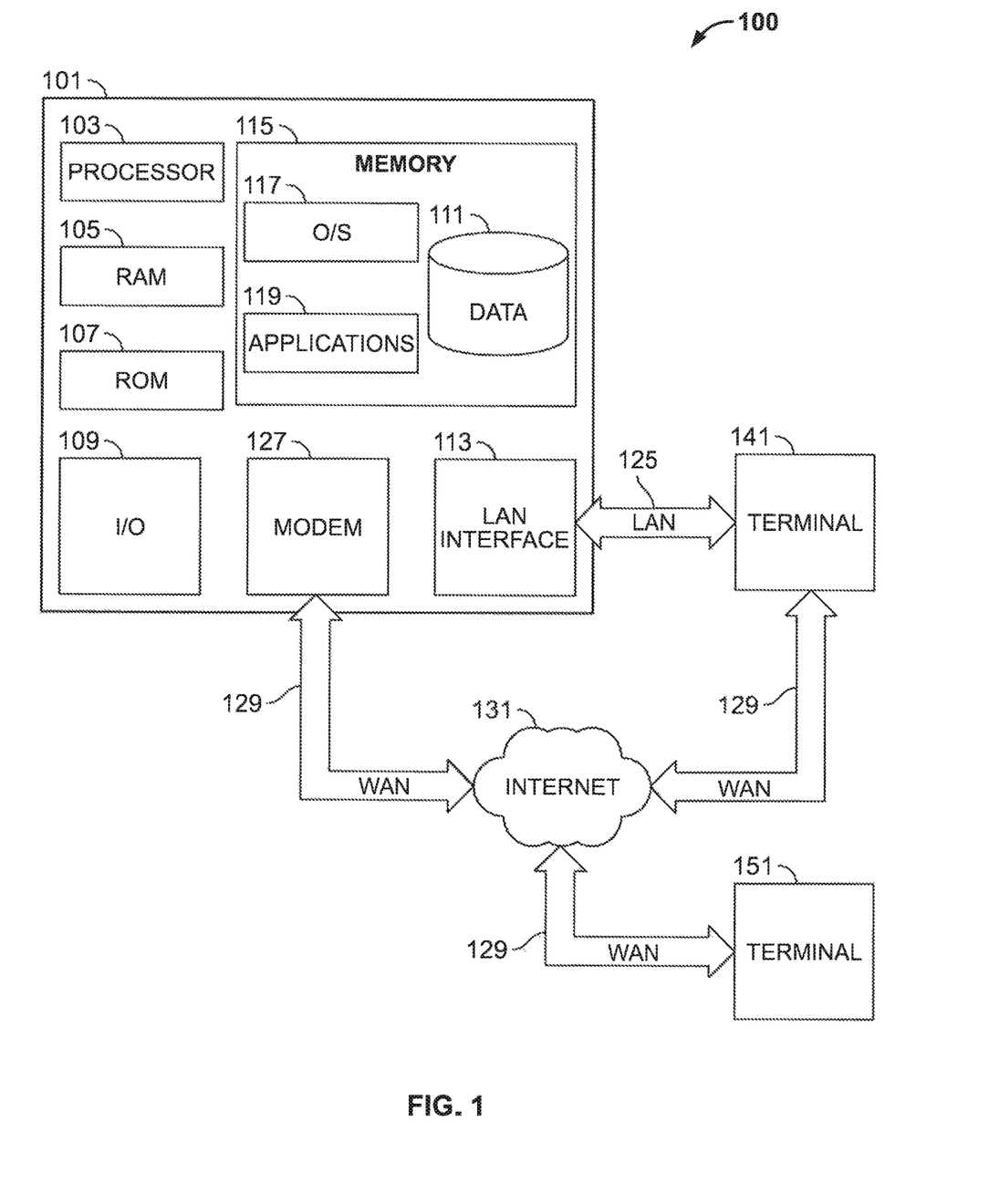
FIG. 1 shows an illustrative system in accordance with principles of the disclosure.

FIG. 1 shows an illustrative block diagram of system 100 that includes computer 101. Computer 101 may alternatively be referred to herein as a "server" or a "computing device." Computer 101 may be a workstation, desktop, laptop, tablet, smart phone, or any other suitable computing device. Elements of system 100, including computer 101, may be used to implement various aspects of the systems and methods disclosed herein.

Computer 101 may have a processor 103 for controlling the operation of the device and its associated components, and may include RAM 105, ROM 107, input/output module 109, and a memory 115. The processor 103 may also execute all software running on the computer—e.g., the operating system and/or voice recognition software. Other components commonly used for computers, such as EEPROM or Flash memory or any other suitable components, may also be part of the computer 101.

The memory 115 may be comprised of any suitable permanent storage technology—e.g., a hard drive. The memory 115 may store software including the operating system 117 and application(s) 119 along with any data 111 needed for the operation of the system 100. Memory 115 may also store videos, text, and/or audio assistance files. The videos, text, and/or audio assistance files may also be stored in cache memory, or any other suitable memory. Alternatively, some or all of computer executable instructions (alternatively referred to as "code") may be embodied in hardware or firmware (not shown). The computer 101 may execute the instructions embodied by the software to perform various functions.

Input/output ("I/O") module may include connectivity to a microphone, keyboard, touch screen, mouse, and/or stylus through which a user of computer 101 may provide input. The input may include input relating to cursor movement. The input may relate to transactional information. The input/output module may also include one or more speakers for providing audio output and a video display device for providing textual, audio, audiovisual, and/or graphical output. The input and output may be related to provisioning support associated with a payment instrument.

System 100 may be connected to other systems via a local area network (LAN) interface 113.

System 100 may operate in a networked environment supporting connections to one or more remote computers, such as terminals 141 and 151. Terminals 141 and 151 may be personal computers or servers that include many or all of the elements described above relative to system 100. The network connections depicted in FIG. 1 include a local area network (LAN) 125 and a wide area network (WAN) 129, but may also include other networks. When used in a LAN networking environment, computer 101 is connected to LAN 125 through a LAN interface or adapter 113. When used in a WAN networking environment, computer 101 may include a modem 127 or other means for establishing communications over WAN 129, such as Internet 131.

It will be appreciated that the network connections shown are illustrative and other means of establishing a communications link between computers may be used. The existence of various well-known protocols such as TCP/IP, Ethernet, FTP, HTTP and the like is presumed, and the system can be operated in a client-server configuration to permit a user to retrieve web pages from a web-based server. The web-based server may transmit data to any other suitable computer system. The web-based server may also send computer-readable instructions, together with the data, to any suitable computer system. The computer-readable instructions may be to store the data in cache memory, the hard drive, secondary memory, or any other suitable memory.

Additionally, application program(s) 119, which may be used by computer 101, may include computer executable instructions for invoking user functionality related to communication, such as e-mail, Short Message Service (SMS), and voice input and speech recognition applications. Application program(s) 119 (which may be alternatively referred to herein as "plugins," "applications," or "apps") may include computer executable instructions for invoking user functionality related performing various tasks. The various tasks may be related to provisioning support associated with a payment instrument.

Computer 101 and/or terminals 141 and 151 may also be devices including various other components, such as a battery, speaker, and/or antennas (not shown).

Terminal 151 and/or terminal 141 may be portable devices such as a laptop, cell phone, Blackberry™, tablet, smartphone, or any other suitable device for receiving, storing, transmitting and/or displaying relevant information. Terminals 151 and/or terminal 141 may be other devices. These devices may be identical to system 100 or different. The differences may be related to hardware components and/or software components.

Any information described above in connection with database 111, and any other suitable information, may be stored in memory 115. One or more of applications 119 may include one or more algorithms that may be used to implement features of the disclosure, and/or any other suitable tasks.

The invention may be operational with numerous other general purpose or special purpose computing system environments or configurations. Examples of well-known computing systems, environments, and/or configurations that may be suitable for use with the invention include, but are not limited to, personal computers, server computers, hand-held or laptop devices, tablets, mobile phones, smart phones and/or other personal digital assistants ("PDAs"), multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc., that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

Figure 2:
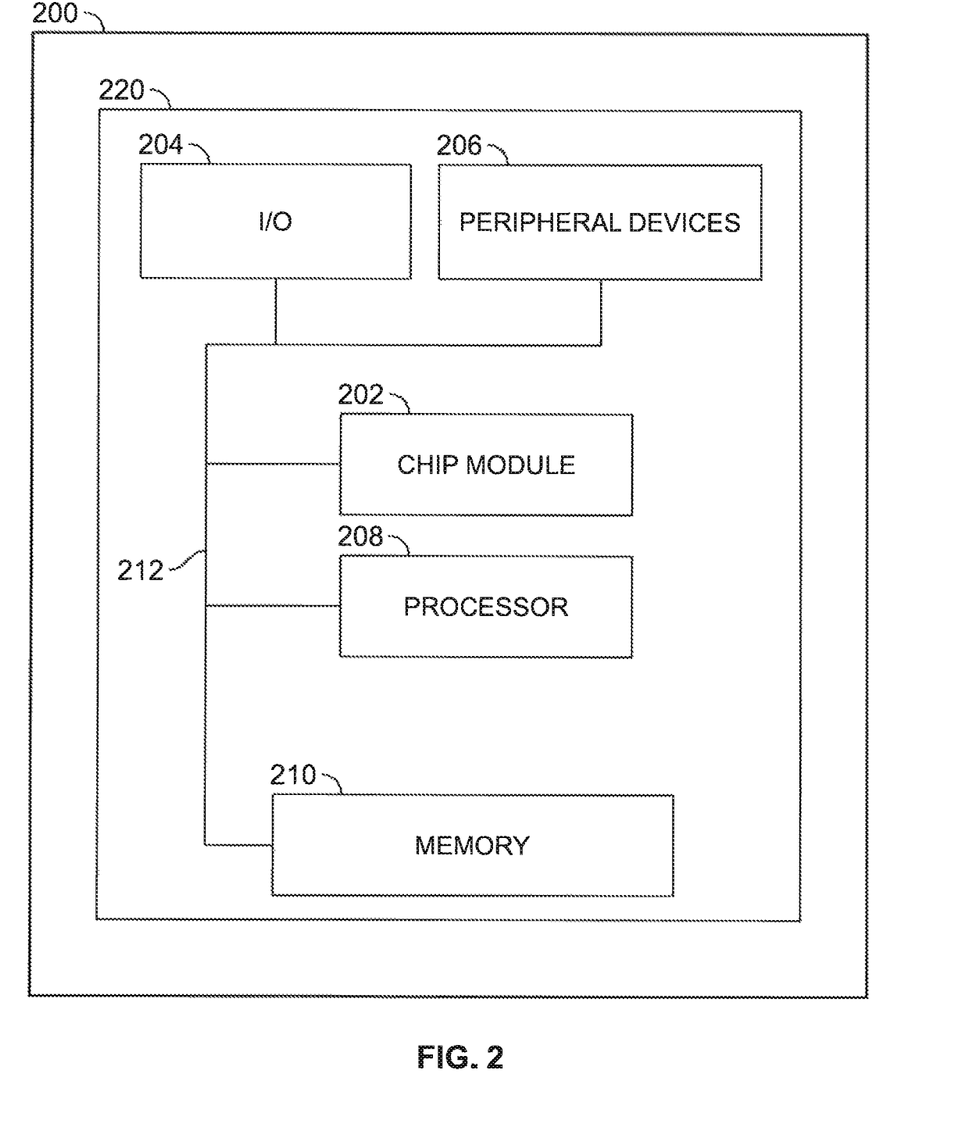
FIG. 2 shows an illustrative apparatus in accordance with principles of the disclosure.

FIG. 2 shows illustrative apparatus 200 that may be configured in accordance with the principles of the disclosure. Apparatus 200 may be a computing machine. Apparatus 200 may include one or more features of the apparatus shown in FIG. 1. Apparatus 200 may include chip module 202, which may include one or more integrated circuits, and which may include logic configured to perform any other suitable logical operations.

Apparatus 200 may include one or more of the following components: I/O circuitry 204, which may include a transmitter device and a receiver device and may interface with fiber optic cable, coaxial cable, telephone lines, wireless devices, PHY layer hardware, a keypad/display control device or any other suitable media or devices; peripheral devices 206, which may include counter timers, real-time timers, power-on reset generators or any other suitable peripheral devices; logical processing device 208, which may compute data structural information and structural parameters of the data; and machine-readable memory 210.

Machine-readable memory 210 may be configured to store in machine-readable data structures: machine executable instructions (which may be alternatively referred to herein as "computer instructions" or "computer code"), applications, signals, and/or any other suitable information or data structures.

Components 202, 204, 206, 208 and 210 may be coupled together by a system bus or other interconnections 212 and may be present on one or more circuit boards such as 220. In some embodiments, the components may be integrated into a single chip. The chip may be silicon-based.

Figure 3:
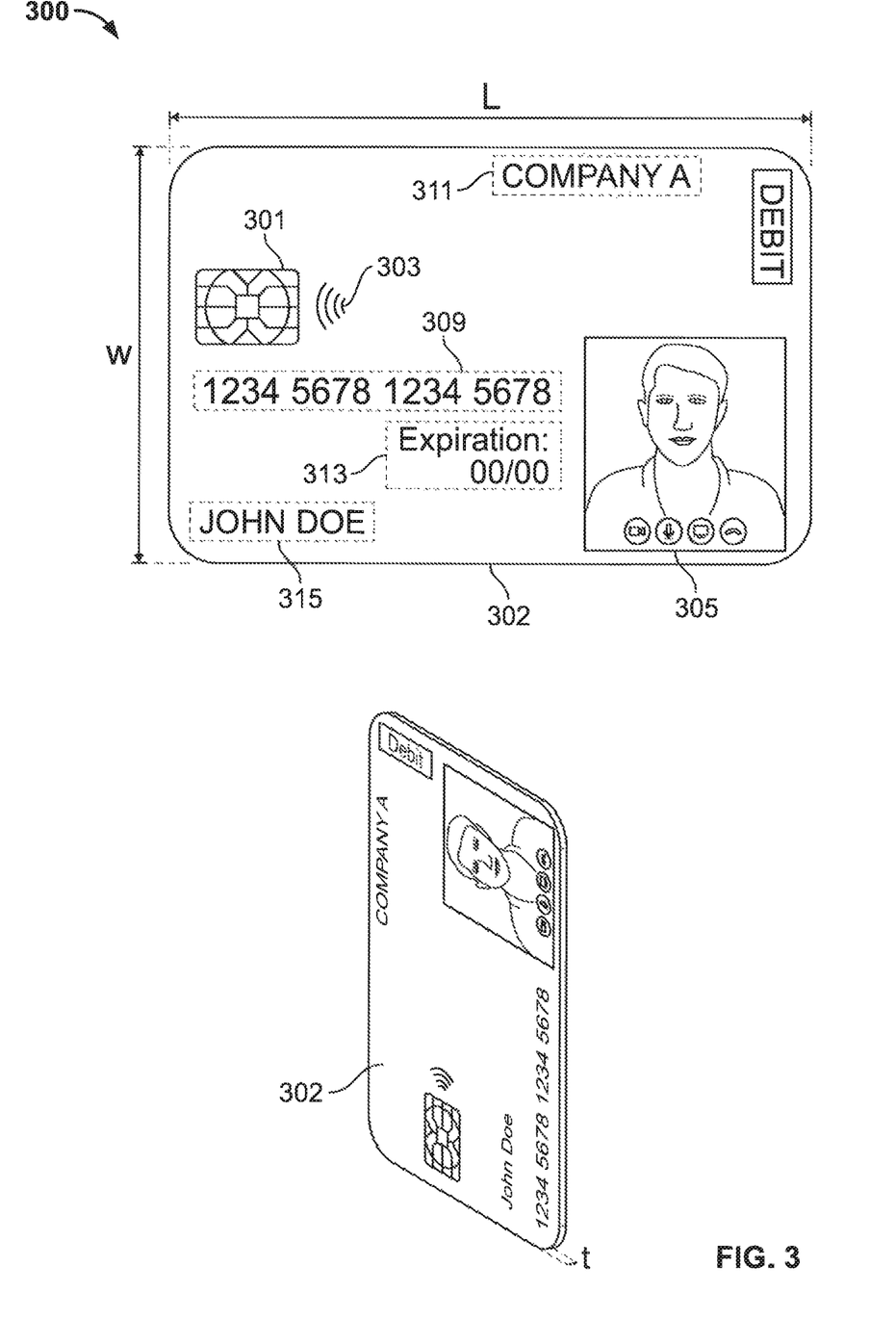
FIG. 3 shows another illustrative apparatus in accordance with principles of the disclosure.

FIG. 3 shows an exemplary payment instrument, illustrative smart card 300, according to aspects of the disclosure. Smart card 300 includes display screen 305. Display screen 305 may be configured to display information. For example, display screen 305 shown in FIG. 3 may be displaying the video feed of a video conference. The video conference may be a live (or, in some embodiments or scenarios, a prerecorded) video chat with a support associate. Smart card 300 may also include a speaker. The speaker may be configured to play the audio portion of a video conference or recording. Display screen 305 may, in some embodiments, be used by a user of smart card 300 to enter a request for support. Display screen 305 may be a touchscreen.

Smart card 300 includes a microprocessor and other components for capturing and storing information entered by a user. Smart card 300 may, in certain embodiments, be configured to encrypt the information. Smart card 300 may also include executable instructions for packaging information entered via a keypad (e.g., display screen 305 configured as a touchscreen) into instructions. The instructions may be requests for support. The instructions may also be transactional instructions. Transactional instructions may be executed by a secure transaction gateway.

FIG. 3 shows that smart card 300 includes chip 301. Chip 301 may provide an electrical contact that is accessible through housing 302. Chip 301 may provide an electrical contact for establishing a wired or contact based communication channel with an ATM or POS terminal when card 300 is inserted into a card reader of the ATM or POS terminal. Chip 301 may be an EMV chip. Chip 301 may facilitate charging of one or more components of smart card 300.

Chip 301 may store a copy of information printed on a face of smart card 300. For example, chip 301 may store account number 309, user name 315, expiration date 313 and issuing bank 311. Chip 301 may also store encrypted security information. The encrypted security information may be utilized to provide a "second factor" method of authentication prior to triggering execution of transaction instructions.

For example, smart card 300 may package information entered by user 315 via keypad 305 into transaction instructions. The transaction instructions may include a PIN associated with smart card 300. The staged transaction instructions may be submitted for execution to a transaction gateway without requiring any further input from user 315. The transaction instructions may be transferred to the transaction gateway using wireless circuitry 303. In some embodiments, the transaction instructions may be transferred via wired communication with chip 301.

After a transaction gateway receives transaction instructions formulated by smart card 300, the transaction gateway may, in certain embodiments, first verify that the PIN included in the transaction instructions is associated with smart card 300. For example, the transaction gateway may communicate with a remote payment processing server operated by the issuer and determine whether the received PIN is associated with user name 315 and/or account number 309.

As a second factor method of authentication, the transaction gateway may determine whether the PIN included in the transaction instructions successfully unlocks encrypted security information stored on chip 301. If the PIN successfully unlocks the encrypted security information, the transaction gateway may execute the received transaction instructions.

Smart card 300 may be any suitable size. FIG. 3 shows that smart card 300 has width w and length l. For example, width w may be 53.98 millimeters ("mm"). Length l may be 85.60 mm. Smart card 300 has thickness t. An illustrative thickness t may be 0.8 mm. An exemplary form factor of smart card 300 may be 53.98 mm×85.60 mm×0.8 mm. Such an exemplary form factor may allow smart card 300 to conveniently fit into a user's wallet or pocket. This exemplary form factor may allow smart card 300 to fit into a card reader of an ATM or POS terminal.

Figure 4:
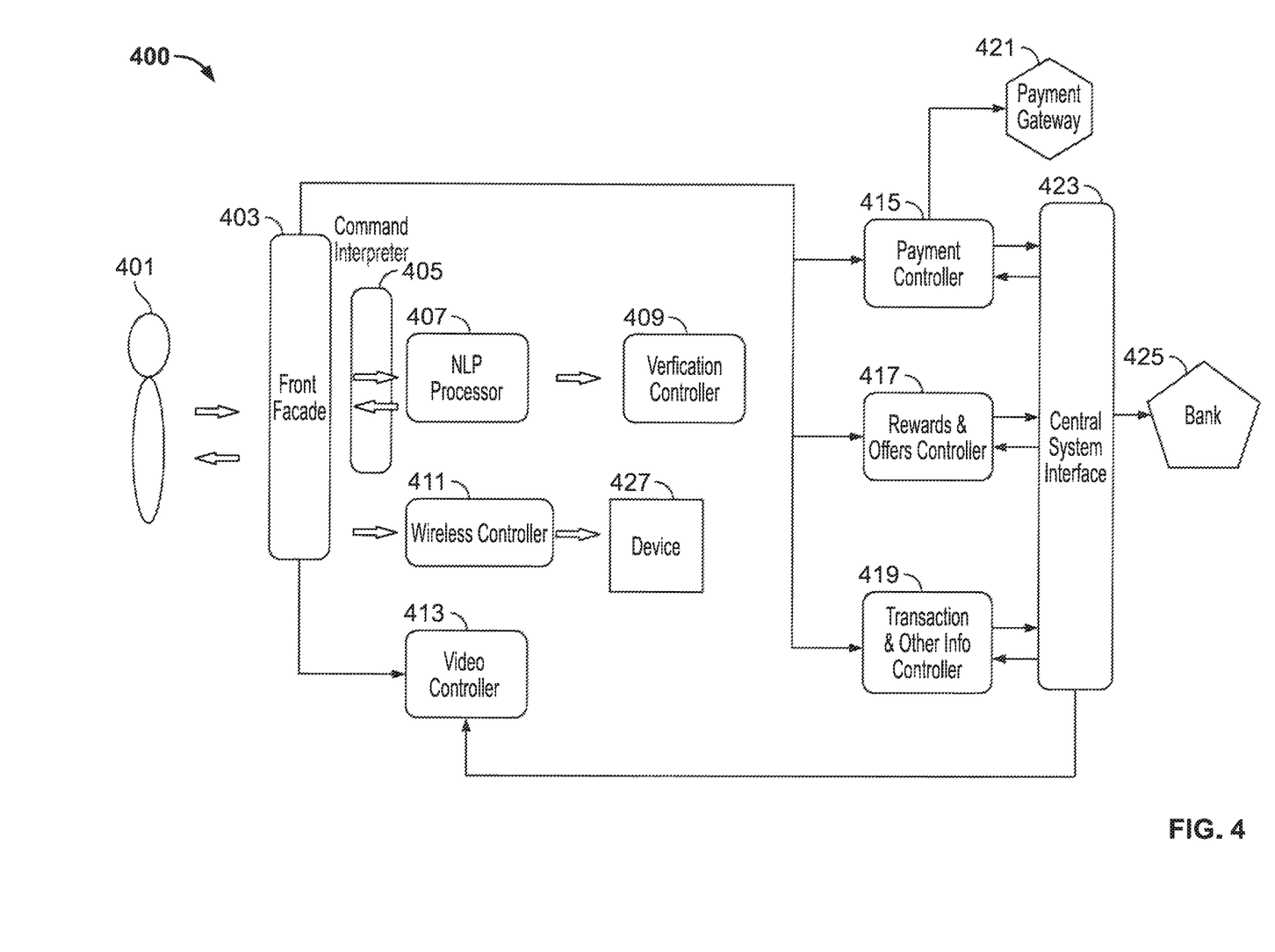
FIG. 4 shows an illustrative system architecture in accordance with principles of the disclosure.

FIG. 4 shows exemplary system architecture 400 according to aspects of the disclosure. User 401 may interface with the system via front façade 403. The interface may be in the form of tactile input of instructions. In some preferred embodiments, the interface may be in the form of voice instructions entered via a microphone. The instructions may be interpreted via command interpreter 405. Interpretation may include natural language processing (NLP) executed by NLP processor 407. The instructions and/or interpretations may be verified via verification controller 409.

The system may communicate via wireless controller 411. Wireless communications may be transmitted to device 427. Device 427 may be a nearby mobile phone. The mobile phone may be associated with user 401.

User 401 may interface with the system via front façade 403 by receiving information. The information may include a video conference with a support representative. The video may be received via video controller 413. Video controller 413 may receive information to display from central system interface 423. Central system interface 423 may be associated with a financial institution such as bank 425.

User instructions processed via front façade 403 may be transmitted central system interface 423 via one of multiple controllers. A transaction instruction may be transmitted via payment controller 415. Executing a transaction instruction may include transmitting the transaction to payment gateway 421. A rewards inquiry may be transmitted via rewards and offers controller 417. A transaction or other information inquiry may be transmitted via controller 419. Components 403-419 may be resident on a smart card configured according to aspects of the disclosure.

Figure 5:
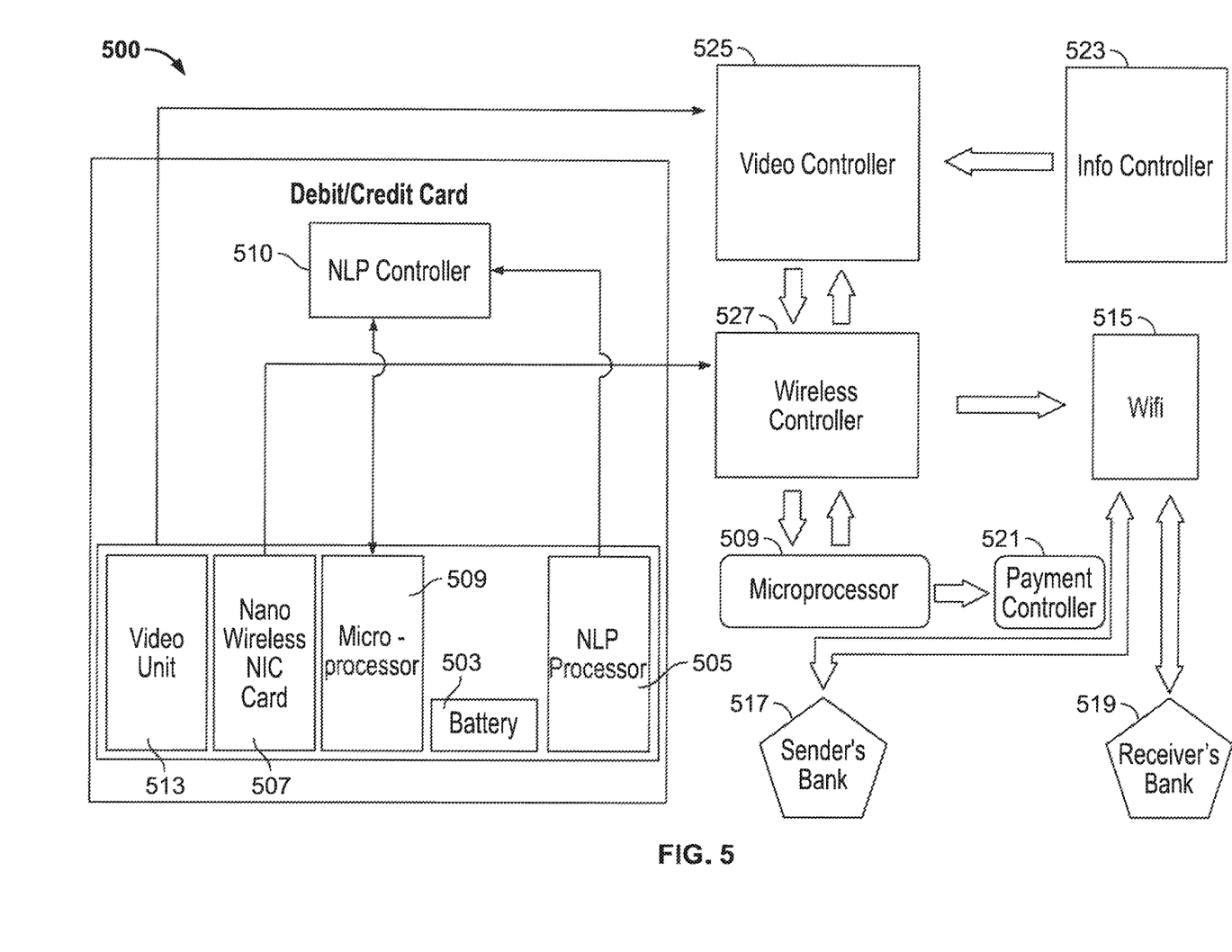
FIG. 5 shows another illustrative system architecture in accordance with principles of the disclosure.

FIG. 5 shows another exemplary system architecture including smart card 500 according to aspects of the disclosure. Smart card 500 may include one or more features of smart cards 300 or the system shown in architecture 400. Smart card 500 includes information controller 523. Information controller 523 may direct data associated with video controller 525. Smart card 500 may display information (e.g., a video feed) via video unit 513. The information may be derived from the data associated with video controller 525.

Information controller 523 may include, or work in conjunction with, NLP controller 510. NLP controller 510 may direct data captured via NLP processor 505. The NLP data may include the translation of audible instruction (captured, for example, by a microphone) into computer executable instructions. Information controller 523 may, in some embodiments, encrypt the data. Illustrative encryption algorithms include RSA cryptography, Blowfish, AES, RC4, RC5, and RC6. Information controller 523 may store data locally on smart card 500.

Smart card 500 includes microprocessor 509 which controls overall operation of smart card 500 and its associated components. For example, microprocessor 509 may control operation of NIC 507 and communication via wireless controller 527 and WiFi component 515. Wireless communication may be with one or more central systems, such as bank(s) 517 and 519 which may be associated with the user and/or senders or receivers in a transaction. In case of a transaction, the system may include payment controller 521.

The steps of methods may be performed in an order other than the order shown and/or described herein. Embodiments may omit steps shown and/or described in connection with illustrative methods. Embodiments may include steps that are neither shown nor described in connection with illustrative methods.

Illustrative method steps may be combined. For example, an illustrative method may include steps shown in connection with another illustrative method.

Apparatus may omit features shown and/or described in connection with illustrative apparatus. Embodiments may include features that are neither shown nor described in connection with the illustrative apparatus. Features of illustrative apparatus may be combined. For example, an illustrative embodiment may include features shown in connection with another illustrative embodiment.

The drawings show illustrative features of apparatus and methods in accordance with the principles of the invention. The features are illustrated in the context of selected embodiments. It will be understood that features shown in connection with one of the embodiments may be practiced in accordance with the principles of the invention along with features shown in connection with another of the embodiments.

One of ordinary skill in the art will appreciate that the steps shown and described herein may be performed in other than the recited order and that one or more steps illustrated may be optional. The methods of the above-referenced embodiments may involve the use of any suitable elements, steps, computer-executable instructions, or computer-readable data structures. In this regard, other embodiments are disclosed herein as well that can be partially or wholly implemented on a computer-readable medium, for example, by storing computer-executable instructions or modules or by utilizing computer-readable data structures.

Thus, methods and systems for a smart card with built-in support provisioning mechanism are provided. Persons skilled in the art will appreciate that the present invention can be practiced by other than the described embodiments, which are presented for purposes of illustration rather than of limitation, and that the present invention is limited only by the claims that follow.

What is claimed is:

1. A dedicated smart payment instrument with built-in support provisioning mechanisms, said instrument comprising:
    a microprocessor;
    a display screen;
    one or more sensors, said sensors comprising a camera, a microphone, and/or a tactile sensor;
    a power source for the microprocessor, the display screen, and the sensors;
    a wireless communication element configured to provide wireless communication between the instrument and a central system; and
    a non-transitory memory storing computer-executable instructions, that, when run on the microprocessor, are configured to:
        receive a request from a user of the instrument, via the sensors, to initiate a support session;
        transmit the request to the central system via the wireless communication element;
        receive, from the central system, support session data; and
        display, on the display screen, information based on the support session data;
    wherein:
        the support session comprises a live, interactive, video support session with a support associate; and
        in response to the request:
            the instrument transmits the request to the central system;
            the central system generates a scheduled time for the support session;
            the instrument receives the scheduled time from the central system;
            the instrument displays the scheduled time via the display screen; and
            at the scheduled time, the instrument hosts the live video support session.

2. The instrument of claim 1, wherein:
    the request is an audible request;
    the instrument receives the request via the microphone; and
    the request is processed via voice recognition software.

3. The instrument of claim 1, wherein the request is received via the tactile sensor, and the tactile sensor comprises a keypad that is separate from the display screen.

4. The instrument of claim 1, wherein the request is received via the tactile sensor, and the tactile sensor is a part of the display screen, wherein the display screen is augmented to be a touchscreen.

5. The instrument of claim 1, wherein, to host the live video support session, the instrument is configured to, in real time:
    receive video and audio of the support associate from the central system, and display the video of the support associate via the display screen and play the audio of the support associate via a speaker component of the instrument; and
    receive audio of the user via the microphone and receive video of the user via the camera, and transmit the audio of the user and the video of the user to the central system.

6. The instrument of claim 1, wherein the support session comprises:
    a balance transfer associated with the instrument;
    an account balance inquiry associated with the instrument;
    a transaction information inquiry associated with the instrument; and/or
    an offer inquiry associated with the instrument.

7. The instrument of claim 1, wherein the instrument is a card, said card comprising metal and/or plastic.

8. The instrument of claim 7, wherein the card has dimensions that conform to the ISO/IEC 7810 ID-1 standard, said dimensions being no greater than 86 millimeters×54 millimeters×0.8 millimeters.

9. The instrument of claim 7, wherein:
    the wireless communication element is a nano wireless network interface card ("NIC");
    the power source is rechargeable via solar energy, inductive charging, and/or a charging port; and
    the microprocessor, the power source, the wireless communication element, and the memory are embedded in the card.

10. A method for augmenting a dedicated payment instrument to leverage built-in access to real-time support from a central system, said method executed via computer-executable instructions that are stored in a non-transitory memory of the instrument and run on a microprocessor embedded in the instrument, the method comprising:
    receiving a request from a user of the instrument, via one or more sensors, to initiate a support session, said sensors comprising a camera, a microphone, and/or a tactile sensor;
    transmitting the request to the central system via a wireless communication element;
    receiving, from the central system, support session data; and
    displaying, on a display screen, information based on the support session data;
    wherein:

the support session comprises a live, interactive, video support session with a support associate; and in response to the request, the method further comprises:
the central system generating a scheduled time for the support session;
the instrument receiving the scheduled time from the central system;
the instrument displaying the scheduled time via the display screen; and
at the scheduled time, the instrument hosting the live video support session.

11. The method of claim 10, wherein the request is an audible request, and the method further comprises:
receiving the request via the microphone; and
processing the request via voice recognition software.

12. The method of claim 10, wherein the request is received via the tactile sensor, and the tactile sensor comprises a keypad that is separate from the display screen.

13. The method of claim 10, wherein the request is received via the tactile sensor, and the tactile sensor is a part of the display screen, wherein the display screen is configured to be a touchscreen.

14. The method of claim 10, wherein, to host the live video support session, the method further comprises:
receiving video and audio of the support associate from the central system, and displaying the video of the support associate via the display screen and playing the audio of the support associate via a speaker component of the instrument; and
receiving audio of the user via the microphone and receiving video of the user via the camera, and transmitting the audio of the user and the video of the user to the central system.

15. The method of claim 10, wherein the support session comprises:
a balance transfer associated with the instrument;
an account balance inquiry associated with the instrument;
a transaction information inquiry associated with the instrument; and/or
an offer inquiry associated with the instrument.

16. A system configured to provide internal real-time support for a smartcard, thereby increasing efficiency and security of the smart card, said smart card comprising a metal and/or plastic card and having dimensions that conform to the ISO/IEC 7810 ID-1 standard, said dimensions being no greater than 86 millimeters×54 millimeters×0.8 millimeters, the system comprising:

a microprocessor embedded in the smart card;
a display screen that is affixed to the smart card;
a power source for the microprocessor and the display screen, said power source that is embedded in the smart card and is rechargeable via solar energy, inductive charging, and/or a charging port;
one or more sensors, said sensors comprising a camera, a microphone, and/or a tactile sensor;
a wireless communication element configured to provide wireless communication to a central system, wherein the wireless communication element is a nano wireless network interface card ("NIC") that is embedded in the smart card; and
a non-transitory memory embedded in the smart card and storing computer-executable instructions, that, when run on the microprocessor, are configured to:
receive a request from a user of the smart card, via the sensors, to initiate a support session;
transmit the request to the central system via the wireless communication element;
receive, from the central system, support session data; and
display, on the display screen, information based on the support session data; and
wherein the support session comprises a live, interactive, video support session with a support associate, and in response to the request:
the central system generates a scheduled time for the support session;
the smart card receives the scheduled time from the central system;
the smart card displays the scheduled time via the display screen; and
at the scheduled time, the smart card hosts the live video support session, and, to host the live video support session, the smart card is configured to, in real time:
receive video and audio of the support associate from the central system, and display the video of the support associate via the display screen and play the audio of the support associate via a speaker component of the smart card; and
receive audio of the user via the microphone and receive video of the user via the camera, and transmit the audio of the user and the video of the user to the central system.

* * * * *